United States Patent [19]

Lupinski et al.

[11] 4,065,420

[45] Dec. 27, 1977

[54] METHOD FOR MAKING AQUEOUS POLYIMIDE ELECTROCOATING MIXTURES

[75] Inventors: John H. Lupinski, Scotia; Edith M. Boldebuck; Wilson J. Barnes, both of Schenectady, all of N.Y.

[73] Assignee: General Electric Company, Schenectady, N.Y.

[21] Appl. No.: 641,597

[22] Filed: Dec. 17, 1975

[51] Int. Cl.$^2$ .................................................. C08J 3/00
[52] U.S. Cl. .................................. 260/29.2 N; 204/181
[58] Field of Search ...................................... 260/29.2 N

[56] References Cited

U.S. PATENT DOCUMENTS

| | | | |
|---|---|---|---|
| 3,737,478 | 6/1973 | Boldebuck | 260/78 UA |
| 3,766,117 | 10/1973 | McQuade | 260/29.2 N |
| 3,812,069 | 5/1974 | Boldebuck | 260/29.2 M |
| 3,975,345 | 8/1976 | Fessler | 260/29.2 N |

*Primary Examiner*—Carman J. Seccuro
*Attorney, Agent, or Firm*—William A. Teoli; Joseph T. Cohen; Jerome C. Squillaro

[57] ABSTRACT

A method is provided for making stable electrocoatable polyimide mixtures having a high water content. A solution of polyimide in a dipolar aprotic solvent is heated in the presence of base resulting in a transitory viscosity decrease. Major amounts of water can thereafter be added to the mixture during its reduced viscosity state to produce a stable aqueous mixture.

7 Claims, No Drawings

METHOD FOR MAKING AQUEOUS POLYIMIDE ELECTROCOATING MIXTURES

The present invention relates to a method for making electrocoatable polyamide acid salt mixtures having a major amount of water.

As shown by Lupinski et al U.S. Pat. No. 3,850,773, assigned to the same assignee as the present invention, polyimide coated conductors can be made by passing a conducting substrate into a polyamide acid salt bath consisting of water, a dipolar aprotic organic solvent and a polyamide acid salt in a continuous manner. The conductor, which can be in the form of an aluminum strip having electrodeposited polyamide acid, is thereafter fed into a curing tower to convert the polyamide acid to the polyimide state. Although electrocoating techniques utilizing polyamide acid salts provide for valuable results, prior to the present invention, problems associated with dip coat on the surface of the conductor as it emerged from the electrocoating bath due to a high level of organic solvent in the electrocoating bath, often complicated the production of satisfactory cured polyimide coated strip. In addition to pollution problems, wipers had to be employed which often interfered with the surface characteristics of the cured polyimide coating on the conducting strip.

Attempts to add excess water directly to the polyamide acid salt mixtures containing a major amount of dipolar aprotic solvent produced formulations resembling thick yellow mud. In addition, those skilled in the art know that if a polyamide acid has a significant number, such as 50 mole percent or more of carboxy radicals neutralized with base, the coulomb yield of the polyamide acid is generally reduced. The reduction in coulomb yield is due to the fact that more ionic sites are available on the polymer chain and more current is needed to transport the polymer.

A method which has been developed to convert polyimides to polyamide acid salts capable of being used to make polyamide acid salt electrocoating mixtures having a high coulomb yield is shown by Boldebuck U.S. Pat. No. 3,737,478, assigned to the same assignee as the present invention. The method of Boldebuck can be used to convert completely imidized polyimides by ring opening technique, which can convert a limited number of polyimide rings to polyamide acid salt radicals, and thus render the polymer electroconducting while maintaining a high coulomb yield. Although high coulomb yield polyamide acid salt compositions can be made by the Boldebuck technique, it has nevertheless been found necessary to use excessive amounts of dipolar aprotic solvents when working with particular polyimides, such as polyamideimides. It would be desirable, therefore, to be able to reduce the amount of organic solvent in polyamide acid salt electrocoating mixtures without reducing the coulomb yield of such polyamide acid salt compositions.

The present invention is based on the discovery that polyimides, defined more particularly hereinafter, can be converted to stable polyamide acid salt electrocoating mixtures having a high water content, if the polyimide in the form of a dipolar aprotic organic solvent solution is heated in the presence of a base to a temperature of up to about 150° C, resulting in the reduction of the solution viscosity, and thereafter combining the solution with at least two parts of water, per part of dipolar aprotic solvent, to produce a stable polyamide acid salt mixture.

There is provided by the present invention a method for making an electrocoatable polyamide acid salt mixture having a high water content which comprises, 1. heating a solution of polyimide in a dipolar aprotic solvent having at least 15% by weight of polyimide, to a temperature in the range of between about 50° C to 150° C in the presence of a base whose ionization constant in water at 25° C has a value greater than $10^{-2}$, until the viscosity of the resulting mixture is less than 4,000 centistokes at 25° C, 2. adding sufficient water to the resulting mixture of (1) while its viscosity is less than 4,000 centistokes at 25° C, to produce a mixture having from 5% to 40% by weight of dipolar aprotic organic solvent, 40% to 95% by weight of water and 1 to 15% by weight of solids, where the total weight of solids, water and dipolar aprotic solvent is equal to 100%, and the base is utilized in the solution of (1) at a concentration which is sufficient to neutralize any carboxy radicals of the polyimide, while providing from 0.01 to about 1 meq of base/g of polyimide having a MW sufficient to produce a viscosity of at least 1,000 centistokes at 25° C in N-methylpyrrolidone when present at 25% by weight solids.

Included by the polyimides, which can be used to make the electrocoating compositions of the present invention, are polyamideimides consisting essentially of the following chemically combined units,

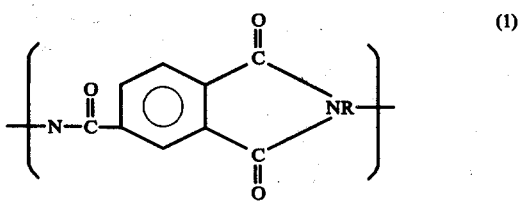

where R is a divalent organic radical selected from ($C_{6-20}$) aromatic radicals and ($C_{1-8}$) aliphatic organic radicals.

The polyamideimides consisting essentially of chemically combined units of formula (1), can be in the form of homopolymers, and copolymers having up to about 50 mole percent of other chemically combined units, such as amide, units derived from aminocarboxylic acids, for example, aminoalkylene carboxylic, dicarboxylic acid and diamines, etc., based on the total moles of chemically combined amideimide units and amide units. In addition to units of formula (1), the polyimides of the present invention also can consist essentially of the following chemically combined units

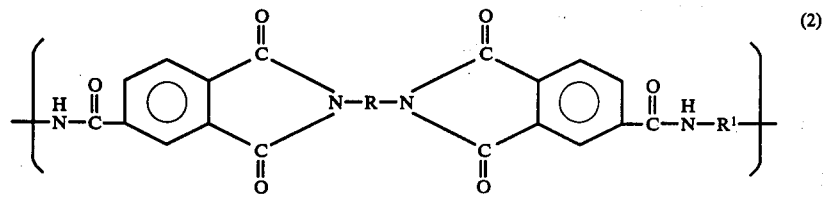

where R is as previously defined, and R and R[1] can be the same or different divalent organic radical selected from ($C_{6-20}$) aromatic radicals and ($C_{1-8}$) aliphatic organic radicals. The polyamideimides of formula 2, also can exist in the form of homopolymers and copolymers as previously indicated for the polyamideimides, consisting essentially of formula (1) units.

In addition to polyamideimides, consisting essentially of units formula (1), or formula (2), or a mixture thereof, the polyimides of the present invention also include polyimides shown by Crivello U.S. Pat. Nos. 3,732,189, 3,740,378, 2,855,239 and 3,766,138, all assigned to the same assignee as the present invention. Some of these polyimides can consist of chemically combined units of the formula,

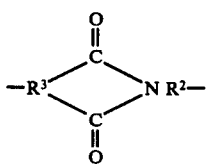

or chemically combined units of the formula,

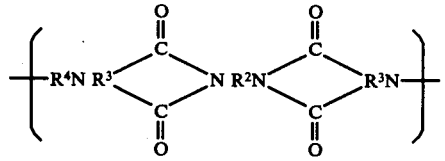

where $R^2$ and $R^4$ can be same or different, and selected from R radicals and $R^3$ is a divalent organo radical for example,

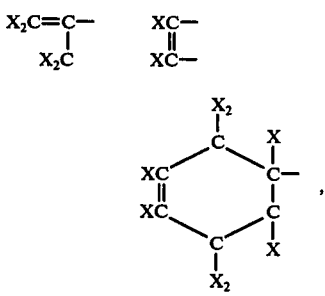

and X is selected from hydrogen, lower alkyl, halogen or mixtures thereof, such as chloro, methyl, ethyl, propyl, bromo, etc.

Radicals included by R, R[1], $R^2$ and $R^4$ are, for example, arylene radicals, such as phenylene, tolylene, xylylene, naphthalene, etc.; halo arylene, such as chlorophenylene, bromotolylene, etc.; alkkylene radicals, such as methylene, dimethylene, trimethylene, hexamethylene, etc.; amide containing arylene radicals, amide containing alkylene radicals, etc.

In addition to the above described polyimides having chemically combined units of formulas 1-4, there also can be employed polyimides which are shown in the copending application of William A. Fessler Ser. No. 265,534, filed Aug. 5, 1971 and now U.S. Pat. No. 3,975,345 and assigned to the same assignee as the present invention. These polyimides can be made by reacting two moles of trimellitic anhydride, per mole of organic diamine, such as methylene dianiline, followed by contacting the resulting bis (N-4-carboxy phthalimido) organo reaction product with organo diisocyanate, such as tolylene diisocyanate, or a commercially available isomer mixture of 2,4 and 2,6-tolylene diisocyanate, 4,4'-diphenylmethane diisocyanate, etc.

The bases which can be used in the practice of the invention, having an ionization constant in water at 25° C with a value greater than $10^{-2}$ include, for example, tetraalkyl ammonium hydroxides and metallic hydroxides, which include, for example, alkali metal hydroxides, such as sodium, potassium, lithium, etc.; tetraalkyl ammonium hydroxides, such as tetramethyl, tetrabutyl, etc.; alkoxides, such as sodium methoxide, potassium methoxide, etc.; phenoxides, such as sodium phenoxide, potassium phenoxide, lithium phenoxide, etc. In addition, organic bases, such as guanidine, etc., may be used.

Included by the dipolar aprotic organic solvent which can be employed in the practice of the present invention are, for example, N,N-dimethylformamide, N,N-dimethyl acid amide, N,N-diethylformamide, N,N-diethyl acid amide, N,N-dimethylmethoxy acid amide, N-methylcaprolactam, dimethylsulfoxide, N-methyl-2-pyrrolidone, tetramethylurea, pyridin, dimethylsulfone, tetramethylene sulfone, N-methylformamide, N-acetyl-2-pyrrolidone, etc.

In the practice of the invention, a dipolar aprotic solvent solution of the "polyimide", which hereinafter can signify any of the above described polyamideimides, etc., having from about 15 to 40 percent solids is heated to a temperature in the range of from 50° C to 150° C in the presence of base within the above described limits. Heating is continued, if necessary, to reduce the viscosity of the mixture to 4,000 centistokes or less, which can be from 1 hour or less to 18 hours or more depending upon the weight percent solids, the temperature employed, etc. Polyimide is used having a M.W. which is sufficient to provide a viscosity of at least 1,000 centistokes at 25% solids and at 25° C in N-methylpyrrolidone.

It has been found that the heated base containing polyimide-dipolar aprotic organic solvent solution, if allowed to rest at ambient temperatures, will gradually revert back to its initial viscosity. Under such conditions, attempts to add water to the mixture would produce useless formulations. Accordingly, water can be added with agitation to the base containing polyimide mixture at a temperature in the range of 5° C to 60° C while it is still in the reduced viscosity state.

The proportion of water which can be added to provide useful electrocoating formulations which are stable over an extended period of time can vary widely depending upon solids requirements, such as 1% to 15%, desired in the final composition. For example, a proportion of from 2-5 parts of water, per part of dipolar aprotic solvent will not be unusual. A preferred composition, for example, would be from 5-15 parts of polyimide solids, from 15-40 parts of solvent and from 45-80 parts of water.

In order that those skilled in the art will be better able to practice the invention, the following examples are given by way of illustration and not by way of limitation. All parts are by weight.

EXAMPLE 1.

A polyamideimide was prepared as follows:

There was added 76.85 parts of trimellitic anhydride to a solution containing 39.65 parts of methylene dianiline dissolved in 255 parts of N-methylpyrrolidone to produce a solution having a mole ratio of trimellitic anhydride to methylene dianiline of 2 to 1. The mixture was cooled in an ice bath and the contents were stirred for 3 hours. The solution was then allowed to warm to room temperature and 50 parts of xylene and 0.1 part of triphenylphosphite were added. This solution was then heated to reflux for 10 hours. Water was evolved and collected. A sample of the solution was removed and titrated with a standard base solution in accordance with known procedures and there was found 1.014 meq of carboxy per gram of solution. This indicated that there was produced 4,4'-bis(N-4-carboxyphthalimido)-diphenylmethane.

There was added to 128.32 parts of the above described bis(N-4-carboxyphthalimido)diphenylmethane, a solution of 11.33 parts in the form of an isomeric mixture of toluene diisocyanates in a N-methylpyrrolidone solution at 20% solids to produce a mixture having 130.12 meq of carboxy and 130.12 meq of isocyanate. The addition of the toluene diisocyanate was performed in a dropwise manner over a period of 1 hour starting at a temperature of 110° C. The temperature was then increased to 160° C and maintained for 1 hour after the addition had been completed. The mixture was then allowed to cool to room temperature. There was obtained a viscous red-brown solution.

An aqueous NaOH solution was added dropwise to an N-methylpyrrolidone solution of the above described polyamideimide containing 25.3% solids. Sufficient sodium hydroxide was employed to provide for 0.75 meq of base per gram of polymer solids. The resulting clear and viscous solution was then heated to 90° C for 18 hours. During this period the same was stirred and a water cooled condenser returned most of the evaporating water. At the end of the heating period, the sample was allowed to cool to room temperature and the viscosity of the mixture was found to be 482 centistokes at 25° C.

One hundred and fifty parts of the above solution was added slowly to 166.2 parts of water which was being vigorously agitated to produce 303 parts of a dispersion containing 11.6% solids. The mixture was further diluted by addition of 48.7 parts of water. There was obtained a uniform dispersion of a polyamide acid salt consisting of by weight 10.1% solids, 29.5% N-methylpyrrolidone, and 60.4% water. As indicated above, there was .75 meq of base per gram of polymer solids. The polyamide acid solution was used to electrocoat an aluminum strip with a polyamide acid in 10 seconds using a constant voltage of 60 volts. There was obtained a wet deposit having 19.5% solids which upon drying and curing was converted to a flexible poly(amideimide) film having a thickness of about 0.5 to 0.6 mil.

The above procedure was repeated except that an equivalent amount of the base containing N-methylpyrrolidone solution of polyamideimide containing 25.3% solids was not heated. The unheated mixture was added to the same amount of water as described above. There was obtained upon stirring, a thick yellow formulation which was unsuitable for electrocoating purposes.

EXAMPLE 2.

In accordance with the procedure of Example 1, a polyamide acid salt was prepared in N-methylpyrrolidone containing 26.5% solids and using sufficient sodium hydroxide solution to provide 0.75 meq of NaOH per g of polymer. The N-methylpyrrolidone solution was then heated at 90° C over a period of 8 hours to determine the change in viscosity of the solution during the heating period. The heated solution was then allowed to stand at room temperature for a period of 35 days after it had been heated in accordance with the aforementioned procedure. The following table shows the change in viscosity of the solution during the 8 hour heating period at 90° and the reversal in viscosity change after the heated solution was allowed to remain for up to 35 days at room temperature:

| Heating at 90° C Polyamide Acid Salt Solution at 25.5% Solids in N-methylpyrrolidone | |
| --- | --- |
| Time (hrs) | Viscosity (cs at 25° C) |
| 0 | 16,660 |
| 2 | 2,220 |
| 4 | 1,470 |
| 6 | 1,150 |
| 8 | 930 |
| Standing of Same Solution at Room Temperature After Above Heating | |
| Time (days) | Viscosity (cs at 25° C) |
| 1 | 1,160 |
| 2 | 1,350 |
| 3 | 1,630 |
| 13 | 7,320 |
| 20 | 11,760 |
| 35 | 34,000 |

The above solution was reheated to 90° for 18 hours resulting in a final solution viscosity of 324 centistokes at 25° C. After standing for a period of 14 days at room temperature, the viscosity of the solution increased to 1638 centistokes at 25° C; and after standing 34 days it then went as high as 53,500 centistokes.

An electrocoating formulation was prepared from the above mixture having a viscosity of 930 centistokes following the procedure of Example 1. It was found that satisfactory polyimide films were obtained upon an aluminum strip in a continuous manner following the procedure shown in Lupinski et al U.S. Pat. No. 3,850,773, assigned to the same assignee as the present invention.

Although the above examples are limited to only a few of the very many polyimides which can be used in the practice of the method of the present invention, it should be understood that the present invention is directed to the use of a much broader class of polyimides as described in the specification preceeding the examples as well as the employment of a wider variety of dipolar aprotic solvents and bases used in the practice of the method of the present invention.

What we claim as new and desire to secure by Letters Patent of the United States is:

1. A method for making an electrocoatable polyamide acid salt mixture having a high water content which comprises,
    1. heating a polyimide solution of a dipolar aprotic organic solvent having at least 15% by weight of polyimide, to a temperature in the range of between about 50° C to 150° C in the presence of a base whose ionization constant in water at 25° C has a value greater than $10^{-2}$, until the viscosity of the resulting mixture is less than 4,000 centistokes at 25° C.
    2. adding sufficient water to the resulting mixture of (1) while its viscosity is less than 4,000 centipoises at 25° C, to produce a mixture having from 5% to 40% by weight of dipolar aprotic organic solvent, 40% to 95% by weight of water and 1 to 15% by weight of solids, where the total weight of solids, water and dipolar aprotic solvent is equal to 100%, and the base is utilized in the solution of (1) at a concentration which is sufficient to neutralize any carboxy radicals of the polyimide, while providing from 0.01 to about 1 meq of base/g of polyimide having a MW sufficient to produce a viscosity of at least 1,000 centristokes at 25° C in N-methylpyrrolidone when present at 25% by weight solids.

2. A method in accordance with claim 1, where the polyimide is a reaction product of trimellitic anhydride and methylenedianiline followed by the reaction of such bis(N-4-carboxyphthalimide) organo reaction product with an organic diisocyanate.

3. A method in accordance with claim 1, where the polyimide is an amino alkylene carboxylic acid modified reaction product of trimellitic anhydride, methylenedianiline and an organic diisocyanate.

4. A method in accordance with claim 1, where the dipolar aprotic solvent is N-methylpyrrolidone.

5. A method in accordance with claim 1, where the base is sodium hydroxide.

6. A method in accordance with claim 1, where the polyimide consists essentially of chemically combined units of the formula,

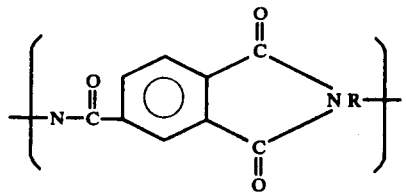

or chemically combined units of the formula,

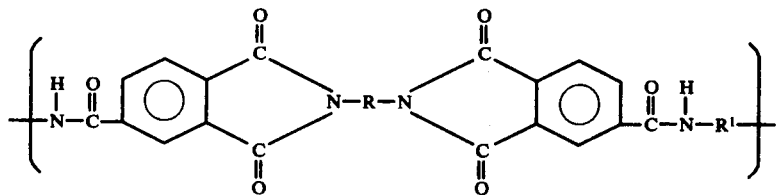

where R and $R^1$ can be the same or different divalent organic radicals selected from $(C_{6-20})$ aromatic and $(C_{1-8})$ aliphatic organic radicals.

7. A method for making an electrocoatable polyamide acid salt mixture having a high water content which comprises
    1. heating a solution of a polyimide which is the reaction product of a bis(n-4-carboxyphthalimide) and an organic diisocyanate in N-methylpyrrolidone having at least 15% by weight of such polyimide, to a temperature in the range of between 50° C to 150° C in the presence of sodium hydroxide until the viscosity of the resulting mixture is less than 4,000 centistokes at 25° C,
    2. adding sufficient water to the resulting mixture of (1) while its viscosity is less than 4,000 centistokes at 25° C to produce a mixture having from 5–15% by weight solids, 15–40% by weight of N-methylpyrrolidone and 45–80% by weight of water where the sodium hydroxide is used to a concentration which is sufficient to neutralize any carboxy radicals of the polyimide while providing from 0.01 to about 1 meq of sodium hydroxide per gram of polyimide.

* * * * *